United States Patent [19]

Bobo et al.

[11] 4,167,868
[45] Sep. 18, 1979

[54] LARGE HOSE AUTOMATIC TESTING DEVICE

[75] Inventors: Stephen N. Bobo, Cohasset; Gordon R. Plank, Medfield, both of Mass.

[73] Assignee: The United States of America as represented by the Secretary of the Department of Transportation, Washington, D.C.

[21] Appl. No.: 963,804

[22] Filed: Nov. 27, 1978

[51] Int. Cl.² ............................................. G01M 3/00
[52] U.S. Cl. .................................................. 73/49.5
[58] Field of Search ................ 73/49.5, 37, 49.6, 49.1

[56] References Cited

U.S. PATENT DOCUMENTS

| | | | |
|---|---|---|---|
| 3,398,573 | 8/1968 | Lloyd | 73/49.5 |
| 3,566,675 | 3/1971 | Ledebur | 73/49.5 |

*Primary Examiner*—Donald O. Woodiel
*Attorney, Agent, or Firm*—Herbert E. Farmer; Harold P. Deeley, Jr.; Otto M. Wildensteiner

[57] ABSTRACT

A hose testing system comprising a source of pressurizing fluid, a distribution system for supplying the fluid from the source to a hose under test, a pump for pumping fluid through the distribution system into the hose under test, a regulator for maintaining a constant volume flow rate for the fluid being pumped into the hose and a gauge for indicating the fluid pressure existing in the hose at any specific time. Because of the constant volume flow rate provided by the test system, the monitored pressure vs. time of the hose under test is indicative also of its pressure vs. volume. Consequently, the system can be used to dynamically measure the internal pressure vs. volume characteristic of a given hose which measurements can in turn be employed to predict its structural integrity.

8 Claims, 4 Drawing Figures

LARGE HOSE AUTOMATIC TESTING DEVICE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to a method and apparatus for testing flexible hose and, more particularly, to a method and apparatus for testing the structural integrity of large cargo transfer hose.

The failure of large cargo transfer hose during use is a serious problem that produces costly and sometimes dangerous consequences. Such hose failure can be caused by fatigue resulting from normal use or by specific damage to a particular hose as sometimes occurs, for example, during a severe storm. Previous techniques for testing the structural integrity of hose has entailed the periodic pressurization of a hose section to a predetermined pressure level and a subsequent measurement of its length. Changes in the measured lengths of hose sections after given periods of use provided indications of the tested hose's structural condition. However, such testing procedures were cumbersome, time consuming and did not provide a satisfactorily accurate indication of structural integrity.

The object of the present invention, therefore, is to provide an improved test method and apparatus that will facilitate more rapid testing of large cargo transfer hose in addition to more accurately assessing the structural integrity thereof.

SUMMARY OF THE INVENTION

The test apparatus of the present invention consists of a source of pressurizing fluid, a distribution system for supplying the fluid from the source to a hose under test, a pump for pumping fluid through the distribution system into the hose under test, a regulator for maintaining a constant volume flow rate for the fluid being pumped into the hose and a gauge for indicating the fluid pressure existing in the hose at any specific time. Because of the constant volume flow rate provided by the test system, the monitored pressure vs. time of the hose under test is indicative also of its pressure vs. volume. Consequently, the system can be used to dynamically measure the internal pressure vs. volume characteristic of a given hose which measurements can in turn be employed to predict its structural integrity.

In a featured embodiment of the invention, the system includes a flow meter for indicating the fluid flow rate in the distribution system and a pressure surge absorber for suppressing fluid pressure pulses therein. The flow meter and surge absorber permit the attainment of more accurate test data. Other featured components of the test system include a relief valve for preventing excessive pressure in the distribution system and a check valve for preventing the flow of fluid from the hose under test back into the distribution system.

A preferred method for utilizing the above test system includes the steps of pressurizing the hose under test to a given pressure with fluid pumped at a constant flow rate, continuously measuring the fluid pressure within the hose as a function of time during the pressurizing step, allowing the hose to remain at this pressure for ten minutes, depressurizing the hose by removing fluid therefrom, repressurizing the hose with fluid again pumped at a constant flow rate to establish the given fluid pressure therein, measuring fluid pressure within the hose as a function of time during the repressurizing step and again depressurizing the hose by removing fluid therefrom. As noted above, the use of a constant volume flow rate permits the use of readily obtained pressure measurements to obtain pressure vs. volume characteristics desired to assess the structural integrity of the hose. In addition, by comparing data generated in successive tests of a given hose, hysteresis effects can be evaluated.

According to an additional featured method step of the invention, the test hose is maintained in a depressurized state for a substantial period of, for example, 30 minutes after the test procedure described above has been completed and then again repressurized with fluid pumped at a constant flow rate while fluid pressure within the hose is measured continuously as a function of time. The retesting of the hose after a dormant period provides an indication of its restorative capability to overcome the hysteresis effects of the previous tests.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENT

Figure 1:
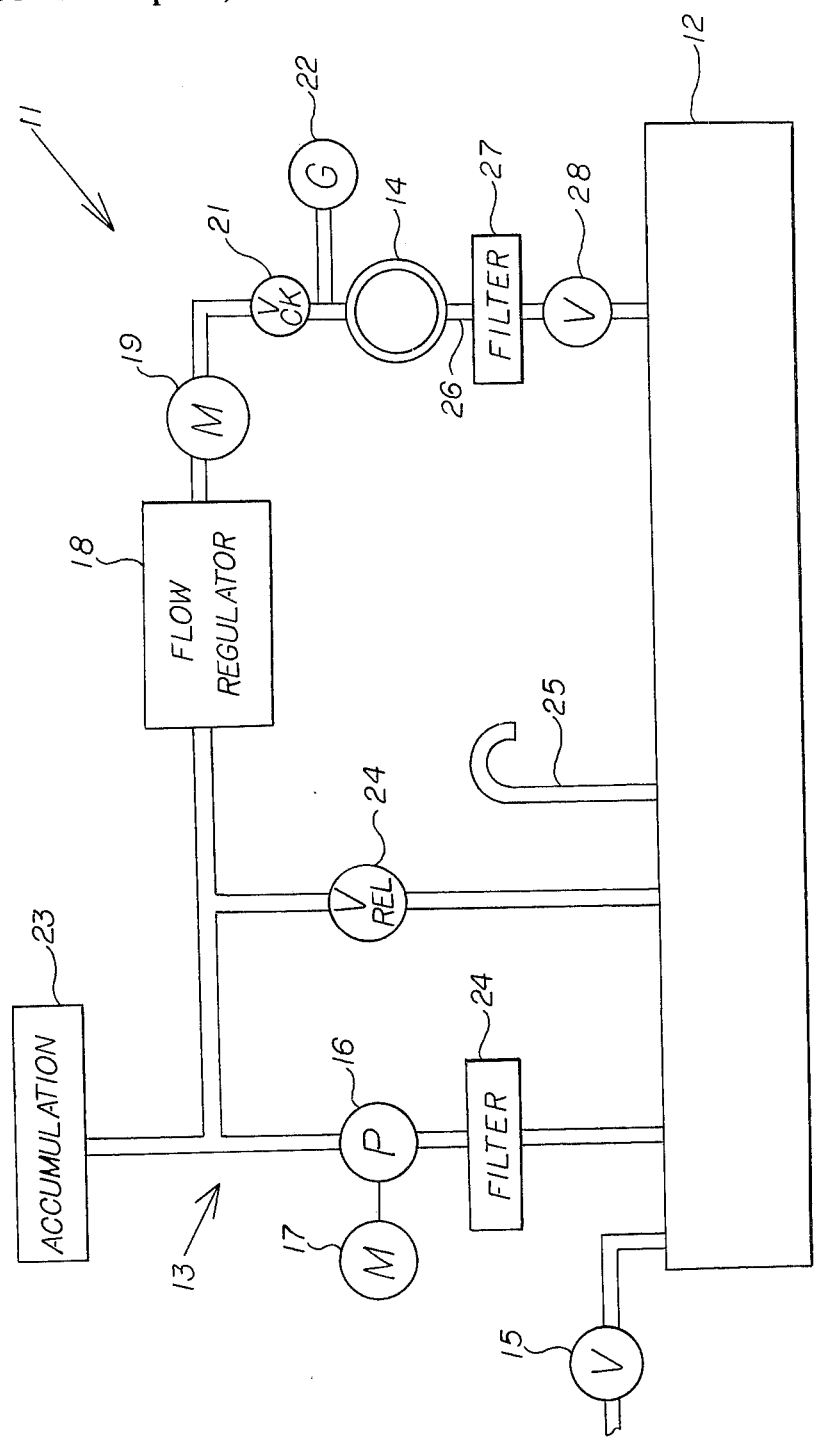
FIG. 1 is a schematic diagram of an hydraulic test system constructed according to the invention.

Referring now to FIG. 1, there is schematically shown an hydraulic test system 11 for dynamically testing the structural integrity of flexible hose. The system 11 includes a reservoir tank 12 for retaining a suitable test fluid and a distribution system 13 for supplying fluid from the tank 12 to a hose 14 under test. The reservoir tank 12 can be supplied with water from an available water supply via a valve 15. Included in the distribution system 13 is a fixed displacement gear pump 16 that provides a constant output and is driven by a dc motor 17. The fluid output of the pump 16 is transmitted by a flow regulator 18 that establishes a constant volume flow rate between the reservoir tank 12 and the test hose 14. That flow rate is indicated by a flow meter 19 located between the flow regulator 18 and test hose 14. Reverse fluid flow from the test hose 14 back into the distribution system 13 is prevented by a check valve 21 while the internal fluid pressure of the test hose 14 is monitored by a pressure gauge 22.

Fluid pressure surges generated by the pump 16 are suppressed by a fluid pressure shock absorber 23, preferably of the bladder accumulator type. The generation of excessive fluid pressure within the distribution system 13 is prevented by a pressure relief valve 24 that responds to excessive pressure by dumping fluid from the distribution system 13 into the reservoir tank 12. Other components of the distribution system 13 include an inlet filter 24 and a vent pipe 25 for providing atmospheric venting of the reservoir tank 12. Fluid within the test hose 14 can be returned to the reservoir tank 12 via a return line 26 that includes an outlet filter 27 and a valve 28.

In preparation for use of the system 11 to test flexible hose, the reservoir tank 12 is filled with a mixture of 95% water and 5% ethylene glycol. The pump 16 is then energized to fill a hose 14 with the test fluid. The test hose 14 is then vented to eliminate any trapped air. The hose 14 is then subjected to three pressure cycles as follows:

Cycle (I): The hose is pressurized at a constant flow rate. A flow rate of $0.05 \times$ nominal hose volume/minute was chosen to pressurize the hose to operation pressure (200-250 psi) in a reasonably short period of time (1-2 minutes). Since the hoses tested had a nominal volume of 40 gallons they were pressurized at a constant flow rate of two gallons per minute to a maximum pressure of 200-250 psi. Internal pressure of the hose is recorded as a function of time on a recorder. As the flow rate remains constant (two gal./min.) this is also a recording of pressure as a function of volume. Pressure in the hose is held for ten minutes before depressurization by opening the outlet valve 28 in the return line 26.

Cycle (II): The hose is immediately repressurized again at a constant flow rate of two gal./min. to the maximum pressure of 200-250 psi. During the repressurization step, the internal pressure of the hose is again recorded as a function of time. After again being depressurized, the hose is allowed to "relax" at ambient pressure for 30 minutes.

Cycle (III): After the 30-minute relaxation time the hose is again repressurized at a constant flow rate of two gal./min. to the maximum pressure of 200-250 psi and pressure is recorded as a function of time. The hose is then depressurized to complete the test procedure.

As an adjunct to the measurement of pressure vs. volume and to gather additional information on the manner in which the hose volume increases, the hose length may be measured before each pressurization, at pressure, and after each depressurization.

Figure 2:
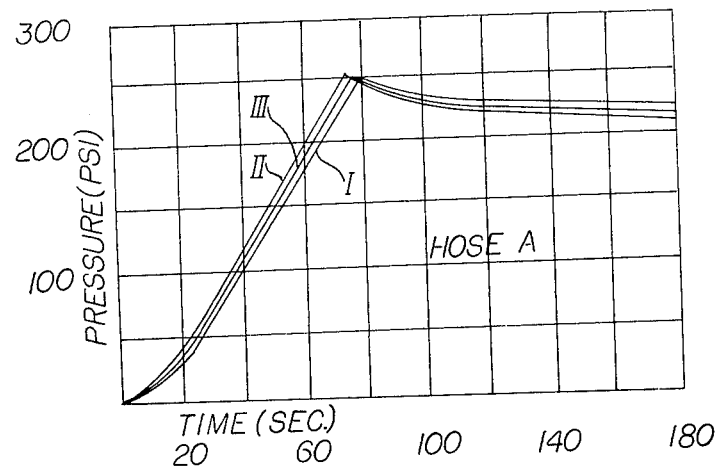
FIG. 2 is a graph illustrating pressure vs. volume data obtained during a test of a hose with the system shown in FIG. 1.
Figure 3:
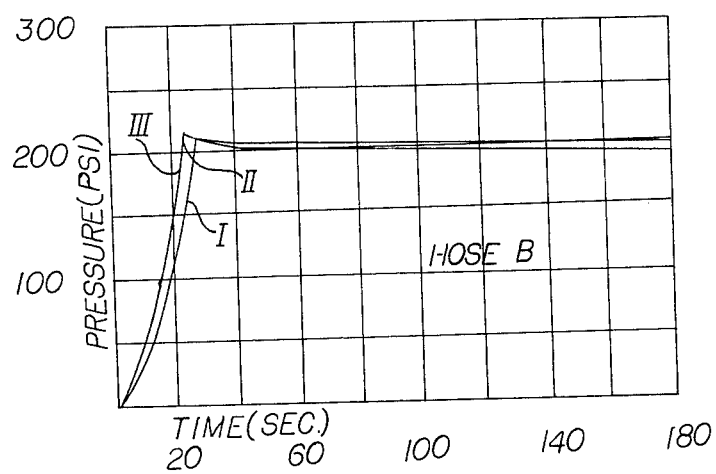
FIG. 3 is a graph illustrating pressure vs. volume data obtained during a test of another hose with the system shown in FIG. 1.
Figure 4:
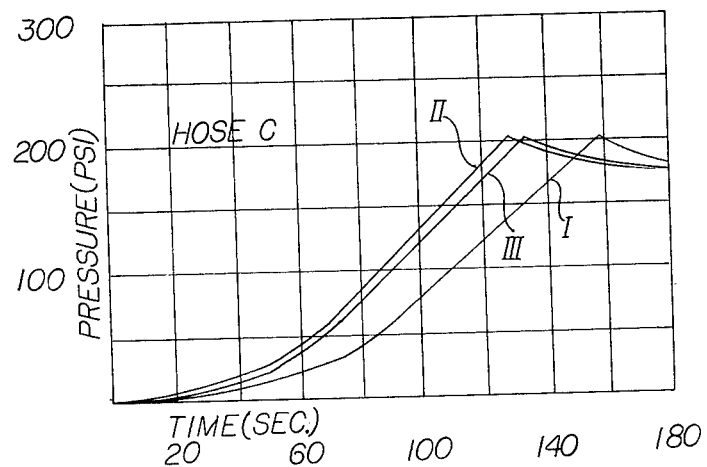
FIG. 4 is a graph illustrating pressure vs. volume data obtained during a test of a third hose with the system shown in FIG. 1.

FIGS. 2-4 are graphs illustrating the pressure-volume relationships of three hoses A, B and C which were tested in the manner described above. FIG. 2 is a plot of data obtained from a new hose A. Between Cycle (I) and Cycle (II), the curves show a hysteresis effect while recovery (after "relaxation") of hose A is noted in Cycle (III).

FIG. 3 is a plot of data obtained from a hose B, the liner of which had failed during use. The curves for hose B exhibit a shorter pressurization time than those of the new hose A indicating significant structural design differences between the hoses. This was confirmed by examination of the hose structures using x-ray techniques. The new hose A had a steel helix reinforcement while the used hose B did not. Hysteresis effects were again present for hose B between Cycle (I) and Cycle (II) but in this case, little recovery is noted for hose B in Cycle (III) after "relaxation".

FIG. 4 is a plot of data obtained from a third hose C that had been subjected to excessive tensile stress. Between Cycle (I) and Cycle (II) it can be seen that substantial hysteresis effects were present in the hose C while some recovery thereof is noted in Cycle (III). Although this hose C also had a steel helix-reinforcement it was found to be excessively compliant as can be seen from the curves in FIG. 4.

The dramatic differences in characteristics among the three hoses A, B and C can further be shown by noting the percentage change in volume of each hose at a specific pressure. From ambient pressure to 200 psi the following percentage change in volume was measured for each hose: hose A—4.81%, hose B—2.19% and hose C—12.24%. From length measurements taken during the tests it was further noted that of the 4.81% percentage change in volume for hose A, 2.98% was due to increased length under pressure, while 1.83% was due to increased diameter under pressure. Hose B, the hose without the steel helix reinforcement, actually became $\frac{1}{4}''$ shorter under pressure indicating that is entire volume change was due to a change in diameter. For hose C, of the 12.24% total percent change in volume, 5.39% was due to increased length under pressure and 6.85% was due to increased diameter. A number of factors may dictate the shape of the curves as illustrated in FIGS. 2-4 and the differences noted in the manner in which the hose expands. The first, most certainly, is the structural design and manufacturing techniques used. Another factor, most important in this application, is the structural integrity of the hose. Certain structural failures of hoses may cause these data curves to change significantly. At the very least, a change in compliance due to structural failure is easily detected by comparing data taken on a new hose with data for the same hose taken after damage has occurred. Another factor that may have an effect on the measured data is the recent pressure history of a hose.

As noted above, structural failure of a hose may cause dramatic changes in its compliance characteristics. By testing a number of hoses, both new and with known structural defects these changes can be quantified. Variables of interest that can be investigated in order to recognize significant patterns of failure include such measures as: (1) percentage hysteresis and recovery in three-cycle testing, (2) pressure change vs. percentage volume increase, and (3) differential pressure-volume changes vs. volume. The measurements of these variables can be carried out on new hoses, retained and compared to like measurements periodically taken on the same hoses after they have been placed in service. Such routine use of dynamic pressure volume testing will yield substantially more information than the static pressure-length measurement formerly used.

Obviously, many modifications and variations of the present invention are possible in light of the above teachings. It is to be understood, therefore, that the invention can be practiced otherwise than as specifically described.

What is claimed is:

1. A method for testing a flexible hose comprising the steps of:

pressurizing the hose by pumping fluid at a constant flow rate into the hose to establish a given fluid pressure therein;

measuring fluid pressure within the hose continuously during said pressurizing step; and simultaneously measuring fluid volume within the hose continuously during said pressurization step to determine the dynamic pressure/volume characteristics indicative of the structural integrity of the hose.

2. A method according to claim 1 which further includes the steps of:
retaining the hose at said fluid pressure for a predetermined time;
depressurizing the hose by partially removing said fluid therefrom;
repressurizing the hose by again pumping fluid at a constant flow rate into the hose to establish said given fluid pressure therein;
measuring fluid pressure within the hose continuously during said repressurizing step;
simultaneously measuring fluid volume within the hose continuously during said second pressurization step; and
depressurizing the hose by partially removing said fluid therefrom.

3. A method according to claim 2 which further includes the steps of:
maintaining the hose in a depressurized state for a period of greater than twenty minutes;
again repressurizing the hose by again pumping fluid at a constant flow rate into the hose to establish said given fluid pressure therein;
measuring fluid pressure within the hose continuously during said third repressurizing step; and
simultaneously measuring fluid volume within the hose continuously during said third pressurization step.

4. Apparatus for testing the structural integrity of flexible hose and comprising:
a source of fluid;
a distribution system for supplying fluid from said source to a hose under test;
pump means for pumping fluid through said distribution system from said source to the hose under test;
regulator means for maintaining a constant volume flow rate for the fluid pumped to the hose under test; and
pressure gauge means for indicating the fluid pressure in the hose under test.

5. Apparatus according to claim 4 including a flow meter for indicating the fluid flow rate in said distribution system.

6. Apparatus according to claim 5 including relief means for limiting the fluid pressure in said distribution system.

7. Apparatus according to claim 6 including pressure surge absorber means for suppressing fluid pulses in said distribution system.

8. Apparatus according to claim 7 including check valve means for preventing the flow of fluid from the hose under test to said distribution system.

* * * * *